(12) United States Patent
Emami

(10) Patent No.: US 11,241,775 B2
(45) Date of Patent: Feb. 8, 2022

(54) APPARATUSES AND METHODS FOR REMOVING A COMPONENT

(71) Applicant: United Technologies Corporation, Farmington, CT (US)

(72) Inventor: Kousha Emami, Frisco, TX (US)

(73) Assignee: Raytheon Technologies Corporation, Farmington, CT (US)

( * ) Notice: Subject to any disclaimer, the term of this patent is extended or adjusted under 35 U.S.C. 154(b) by 89 days.

(21) Appl. No.: 16/537,044

(22) Filed: Aug. 9, 2019

(65) Prior Publication Data

US 2021/0039235 A1 Feb. 11, 2021

(51) Int. Cl.
| | |
|---|---|
| B25B 27/00 | (2006.01) |
| B25B 27/02 | (2006.01) |
| B25B 27/06 | (2006.01) |
| B23P 19/02 | (2006.01) |

(52) U.S. Cl.
CPC .......... *B25B 27/0064* (2013.01); *B23P 19/02* (2013.01); *B25B 27/023* (2013.01); *B25B 27/062* (2013.01)

(58) Field of Classification Search
CPC . B25B 27/023; B25B 27/062; B25B 27/0064; B25B 27/304; B23P 19/02
USPC .................................................. 29/259, 261
See application file for complete search history.

(56) References Cited

U.S. PATENT DOCUMENTS

| | | | |
|---|---|---|---|
| 520,258 A * | 5/1894 | Davis ...................... | B27H 7/00 |
| | | | 157/12 |
| 4,123,838 A | 11/1978 | Magavero | |
| 4,195,718 A | 4/1980 | Schmohe | |
| 4,210,990 A | 7/1980 | Krieger | |
| 4,406,182 A | 9/1983 | Antone | |
| 4,570,319 A * | 2/1986 | Skoworodko ........... | F16D 3/405 |
| | | | 29/259 |
| 4,649,615 A | 3/1987 | Hundley | |
| 4,658,488 A | 4/1987 | Johnstead | |

(Continued)

FOREIGN PATENT DOCUMENTS

| | | |
|---|---|---|
| CA | 2090628 A1 | 9/1994 |
| DE | 3522793 A1 | 1/1987 |

OTHER PUBLICATIONS

McMaster-Carr "Super-Corrosion-Resistant 316 Stainless Steel Extra-Wide Hex Nut", Apr. 4, 2019, http://www.mcmaster.com/97619a880.

(Continued)

*Primary Examiner* — Seahee Hong
(74) *Attorney, Agent, or Firm* — Getz Balich LLC

(57) ABSTRACT

An apparatus is provided for removing a component from a device, where the component includes a cylindrical portion and a shoulder adjacent the cylindrical portion. The apparatus includes a base, a puller and a shaft. The base includes a first mount, a second mount and a bridge extending between and connected to the first mount and the second mount. The first mount and the second mount are each configured to engage with the device. The puller includes a forked flange configured to abut against the shoulder of the component when the cylindrical portion of the component is within a channel of the forked flange. The shaft includes a threaded portion mated with a threaded aperture in the bridge. A distal end portion of the shaft is rotatably connected to the puller.

11 Claims, 11 Drawing Sheets

(56) References Cited

U.S. PATENT DOCUMENTS

| | | | |
|---|---|---|---|
| 4,823,453 A * | 4/1989 | Bartlett | B25B 27/023 29/261 |
| 5,894,650 A | 4/1999 | Barenburg | |
| 6,601,277 B1 | 8/2003 | Swanson | |
| 2011/0133473 A1 | 6/2011 | Signore et al. | |
| 2016/0023334 A1* | 1/2016 | Rowe | B25B 27/026 29/426.5 |
| 2016/0169289 A1 | 6/2016 | Kowalewski et al. | |

OTHER PUBLICATIONS

EP search report for EP20190059.4 dated Jan. 19, 2021.

\* cited by examiner

APPARATUSES AND METHODS FOR REMOVING A COMPONENT

BACKGROUND OF THE DISCLOSURE

1. Technical Field

This disclosure relates generally to apparatuses and method for removing (e.g., pulling) a component from a device such as, for example, a component of a gas turbine engine.

2. Background Information

Various apparatuses and methods are known in the art for pulling a component such as a shaft or gear from a device such as a gearbox. While these known apparatuses and methods have various advantages, there is still room in the art for improvement. There is a need in the art therefore for improved apparatuses and methods of removing (e.g., pulling) a component from a device.

SUMMARY OF THE DISCLOSURE

According to an aspect of the present disclosure, an apparatus is provided for removing a component from a device, where the component includes a cylindrical portion and a shoulder adjacent the cylindrical portion. The apparatus includes a base, a puller and a shaft. The base includes a first mount, a second mount and a bridge extending between and connected to the first mount and the second mount. The first mount and the second mount are each configured to engage with the device. The puller includes a forked flange configured to abut against the shoulder of the component when the cylindrical portion of the component is within a channel of the forked flange. The shaft includes a threaded portion mated with a threaded aperture in the bridge. A distal end portion of the shaft is rotatably connected to the puller.

According to another aspect of the present disclosure, a method is provided for removing a component from a device. During this method, a first mount is engaged with the device. A second mount is engaged with the device, where a bridge extends between and is connected to the first mount and the second mount. A forked flange of a puller is mated with the component such that the forked flange is axially, relative to an axis, abutted against a shoulder of the component and a cylindrical portion of the component is within a channel of the forked flange. The component is pulled axially, relative to the axis, away from the device by rotating a shaft about the axis. A threaded portion of the shaft is mated with a threaded aperture in the bridge. A distal end portion of the shaft is rotatably connected to the puller.

The base may be formed as a monolithic body.

The bridge may have a U-shaped geometry.

The first mount may include a first tab that projects out from a first end of the bridge. The second mount may include a second tab that projects out from a second end of the bridge.

The base may be formed from at least a bent length of metal and a nut bonded to the bent length of metal to provide the threaded aperture in the bridge.

The puller may be formed as a monolithic body.

The puller may also include a second flange and an intermediate segment that extends between and connects the forked flange and the second flange. The distal end portion of the shaft may be rotatably connected to the second flange.

The puller may also include a shaft mount. The shaft may include an annular slot extending axially within the shaft between a first annular surface and a second annular surface. The shaft may be arranged within a channel of the shaft mount such that the first annular surface and the second annular surface respectively overlap and are axially adjacent opposing side surfaces of the shaft mount.

The channel of the shaft mount may be partially formed by a semi-circular surface of the shaft mount. The semi-circular surface may be coaxial with the threaded aperture.

The channel of the forked flange may be partially formed by a semi-circular surface of the forked flange. The semi-circular surface may be coaxial with the threaded aperture.

The apparatus may include a head with a polygonal cross-sectional geometry. The head may be formed integral with the shaft. The shaft may project axially out from the head to the distal end portion. The threaded portion may be axially between the head and the distal end portion.

The apparatus may include a first fastener for attaching the first mount to a first portion of the device. The apparatus may also include a second fastener for attaching the second mount to a second portion of the device.

The device may be configured as or otherwise include a component of a gas turbine engine.

The device may be configured as or otherwise include a gearbox.

The component may be configured as or otherwise include a shaft.

The component may be configured as or otherwise include a gear.

The first mount may be attached to the device using at least a first fastener. The second mount may be attached to the device using at least a second fastener.

A tool may be mated with a head for the shaft. The tool may be used to rotate the shaft about the axis.

The puller may also include a shaft mount. The shaft may include an annular slot extending axially along the axis within the shaft between a first annular surface and a second annular surface. The shaft may be arranged within a channel of the shaft mount such that the first annular surface and the second annular surface are respectively axially engageable with and axially next to opposing side surfaces of the shaft mount.

The foregoing features and the operation of the invention will become more apparent in light of the following description and the accompanying drawings.

DETAILED DESCRIPTION

Figure 1:
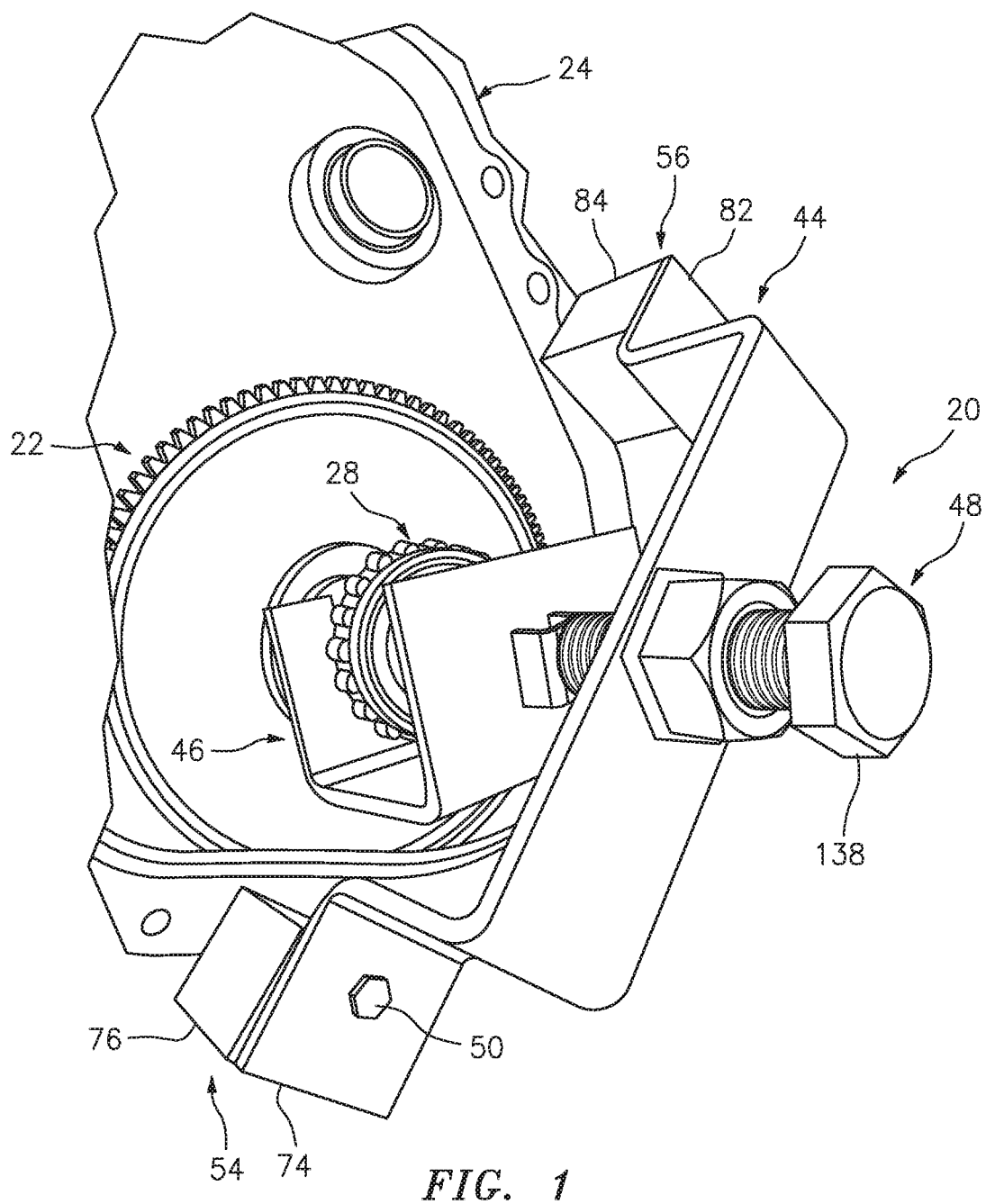
FIGS. 1 and 2 are perspective illustrations of an apparatus for removing a component from a device.
Figure 2:
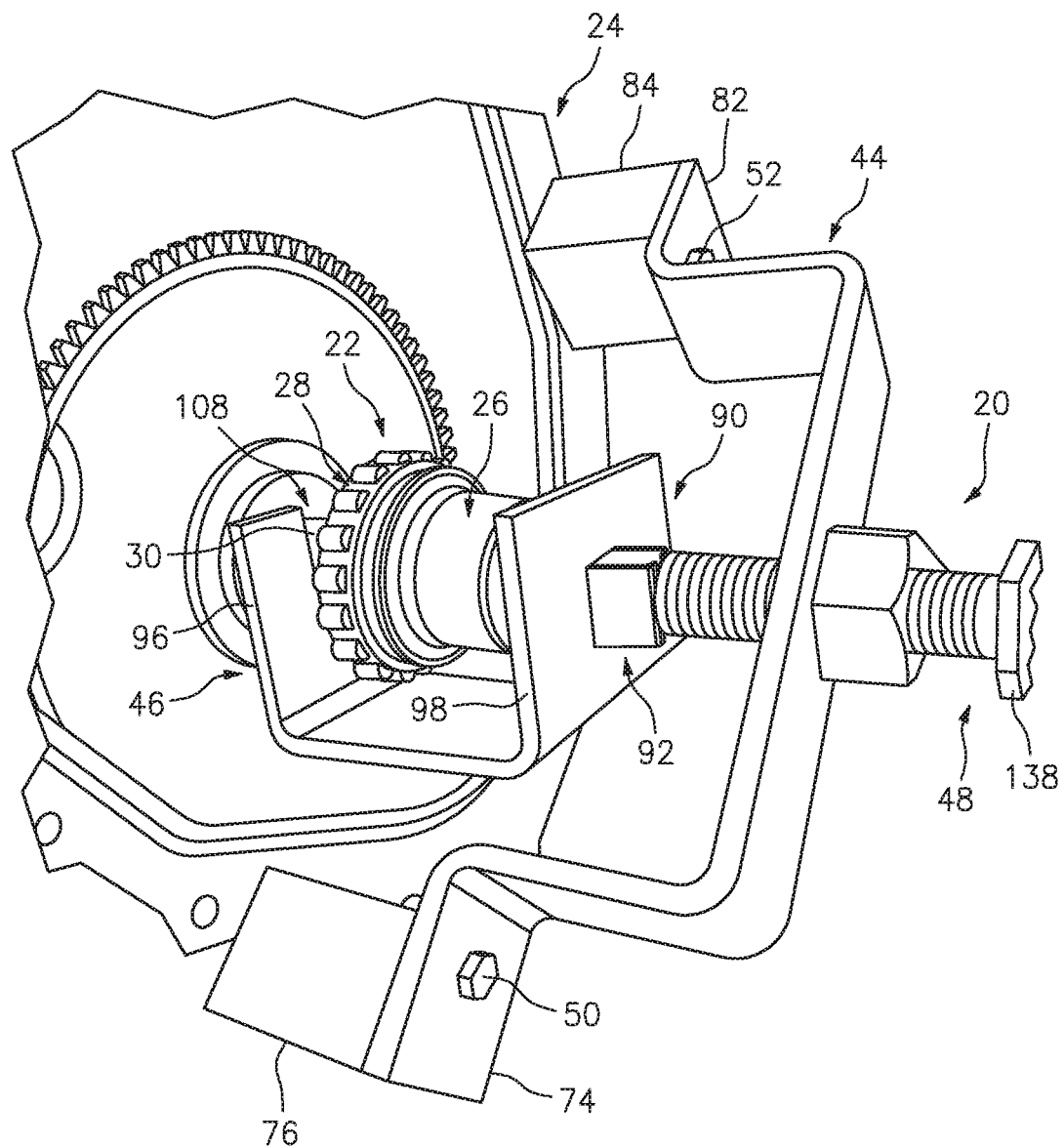

FIGS. 1 and 2 are perspective illustrations of an apparatus 20 (e.g., a component pulling tool) for removing a component 22 from a device 24.

The component 22 may be configured as or otherwise include at least a shaft 26 as illustrated in FIG. 2. The present disclosure, however, is not limited to such an exemplary component. For example, the component 22 may also or alternatively be configured as or otherwise include a gear, pulley, a wheel and/or any other type of rotating element. However, for ease of description, the component 22 is described below as a shaft assembly; e.g., an integrated drive generator shaft assembly.

Figure 3:
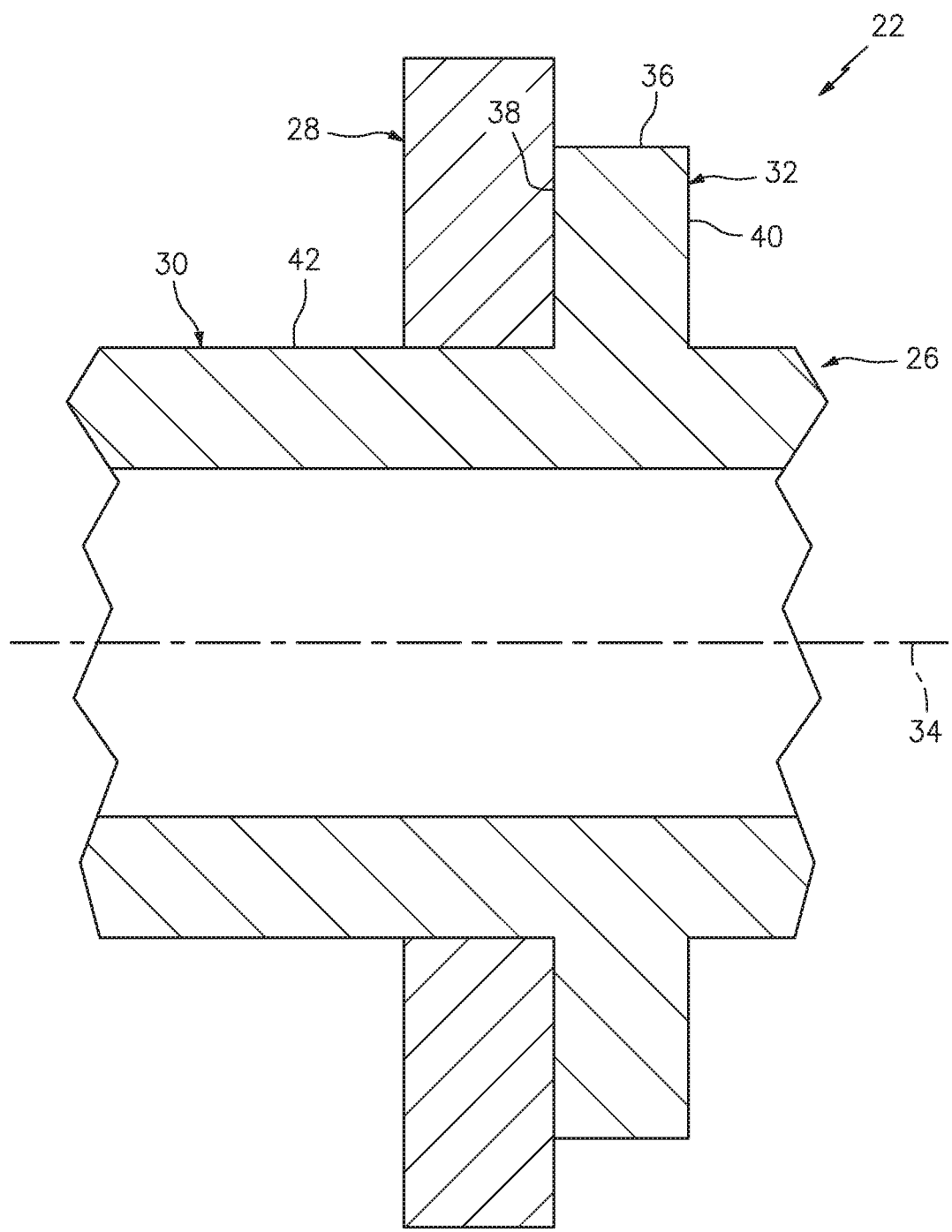
FIG. 3 is a partial side sectional illustration of a shaft assembly with a bearing shown in block diagram form.

In the specific embodiment of FIG. 3, the component 22 (e.g., the shaft assembly) includes at least the shaft 26 and a bearing 28 (shown in block form in FIG. 3) such as, but not limited to, a rolling element bearing. The shaft 26 is configured with a cylindrical portion 30 (e.g., a tubular shaft portion) and (e.g., an annular) shaft flange 32 adjacent the cylindrical portion 30. The cylindrical portion 30 of FIG. 3 extends axially along an axis 34 (e.g., a centerline of the component 22). The shaft flange 32 projects radially out from the cylindrical portion 30 to a distal outer edge 36. The shaft flange 32 extends circumferentially around the axis 34. The shaft flange 32 also extends axially along the axis 34 between opposing annular flange side surfaces 38 and 40, where the side surface 38 is adjacent an outer (e.g., cylindrical) surface 42 of the cylindrical portion 30. The bearing 28 is mounted to the shaft 26, for example, on the cylindrical portion 30 and abutted against the shaft flange 32. With this configuration, the bearing 28 may form a shoulder against which the apparatus 20 may pull as described below in further detail. Of course, in other embodiments, the shoulder may be formed by the shaft flange 32 where, for example, the bearing 28 is disposed against the side surface 40.

The device 24 of FIGS. 1 and 2 may be configured as a component of a gas turbine engine such as, but not limited to, a gearbox; e.g., an accessory gearbox or a fan drive gearbox. The present disclosure, however, is not limited to such an exemplary device. For example, the device 24 may alternatively be configured as or otherwise include another component of the gas turbine engine, or the gas turbine engine itself. Furthermore, the present disclosure is not limited to gas turbine engine application. For example, the apparatus 20 may be used for removing a component from an automotive or industrial internal combustion engine or any other type of rotational equipment.

Referring still to FIGS. 1 and 2, the apparatus 20 includes a tool base 44, a tool puller 46 and a tool shaft 48. The apparatus 20 of FIGS. 1 and 2 also includes one or more fasteners 50 and 52; e.g., threaded bolts.

Figure 4:
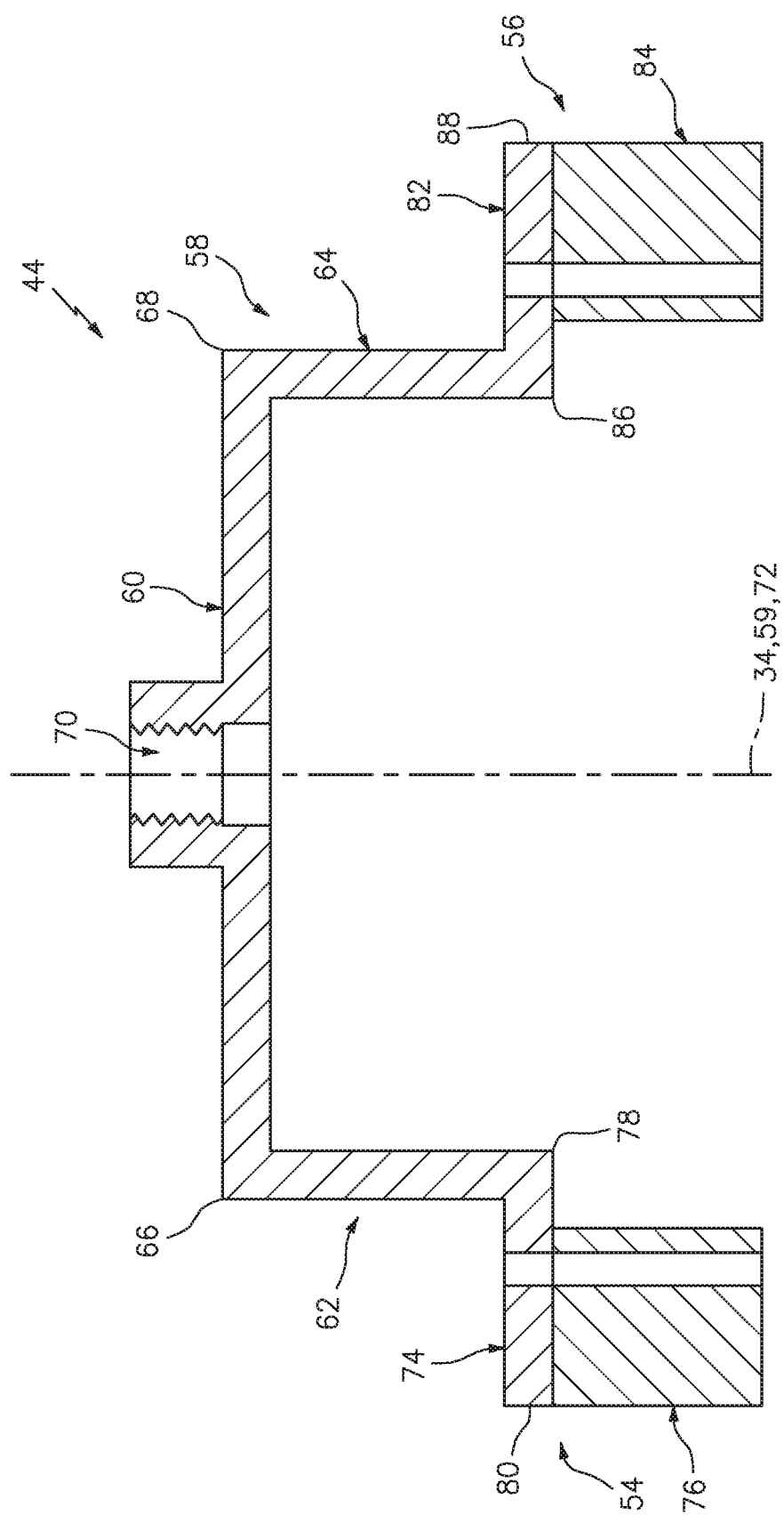
FIG. 4 is a side sectional illustration of a tool base.

The tool base 44 of FIG. 4 includes a first mount 54, a second mount 56 and a bridge 58. The bridge 58 of FIG. 4 has a U-shaped geometry when viewed, for example, in a plane parallel to an axis 59 (e.g., a centerline) of the apparatus 20, which axis 59 may be coaxial with the axis 34 when assembled. For example, the bridge 58 includes a center portion 60, a first riser 62 and a second riser 64. The center portion 60 extends laterally between opposing exterior corners 66 and 68 of the tool base 44. The first riser 62 meets and is connected to (e.g., formed integral with) the center portion 60 at the first exterior corner 66. The first riser 62 projects (e.g., axially) out from the center portion 60 in a first direction to the first mount 54. The second riser 64 meets and is connected to (e.g., formed integral with) the center portion 60 at the second exterior corner 68. The second riser 64 projects (e.g., axially) out from the center portion 60 in the first direction to the second mount 56.

The bridge 58 is configured with a threaded aperture 70. This threaded aperture 70 is centrally located in and extends axially through the center portion 60. A centerline 72 of the threaded aperture 70 may be coaxial with the axis 59.

The first mount 54 of FIG. 4 includes a first tab 74 and a first extension 76 (e.g., a spacer block). The first tab 74 meets and is connected to (e.g., formed integral with) the first riser 62 at a first interior corner 78 of the tool base 44; e.g., a first end of the bridge 58. The first tab 74 is cantilevered from and projects laterally out from the bridge 58 and its first riser 62 in a second direction to a first lateral side 80 of the tool base 44. The first extension 76 axially engages (e.g., contacts) the first tab 74 such that the first tab 74 is axially between the first extension 76 and the bridge 58. The first extension 76 may be attached to the first tab 74 by the first fastener 50 (e.g., see FIGS. 1 and 2) when the first mount 54 is mounted to the device 24 as described below in further detail.

The second mount 56 of FIG. 4 includes a second tab 82 and a second extension 84 (e.g., a spacer block). The second tab 82 meets and is connected to (e.g., formed integral with) the second riser 64 at a second interior corner 86 of the tool base 44; e.g., a second end of the bridge 58. The second tab 82 is cantilevered from and projects laterally out from the bridge 58 and its second riser 64 in a third direction, which is laterally opposite the second direction, to a second lateral side 88 of the tool base 44. The second extension 84 axially engages (e.g., contacts) the second tab 82 such that the second tab 82 is axially between the second extension 84 and the bridge 58. The second extension 84 may be attached to the second tab 82 by the second fastener 52 (e.g., see FIG. 2) when the second mount 56 is mounted to the device 24 as described below in further detail.

At least a portion of the tool base 44 may be formed as a monolithic body. The term "monolithic body" may describe a single, unitary body formed (e.g., cast, machined and/or shaped) as a single mass of material. The term "monolithic body" may also describe a single, unitary body formed by permanently bonding (e.g., welding) multiple bodies together. By contrast, a non-monolithic body may be formed from mechanically interconnected (e.g., compression fit, connected via fasteners, etc.) bodies.

Figure 5:
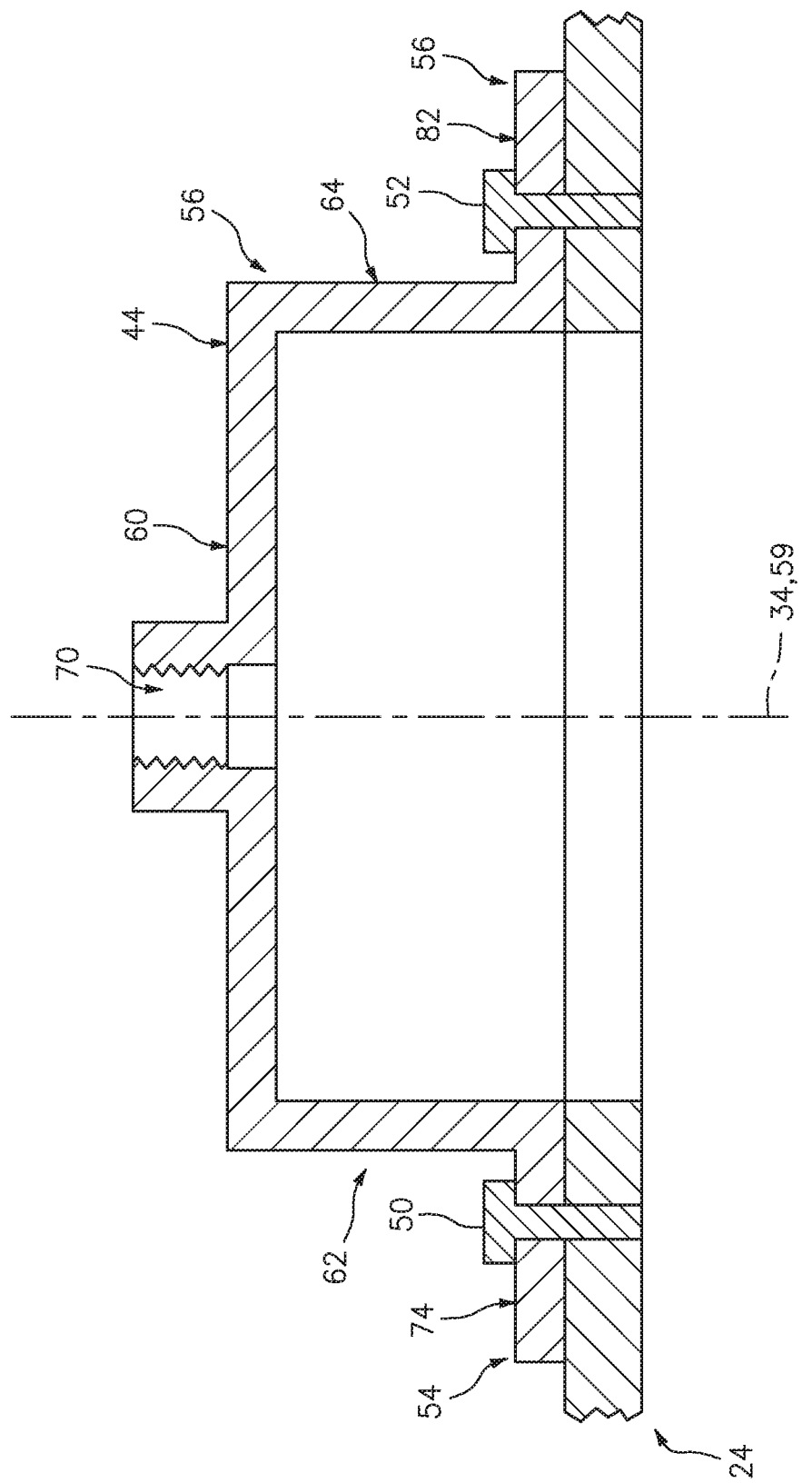
FIG. 5 is a side sectional illustration of another tool base engaged with the device.

In some embodiments, the bridge 58 and the mount tabs 74 and 82 may be formed by bending a length of material; e.g., a strip of metal. The threaded aperture 70 may be formed by drilling an aperture through the bent length of material and bonding (e.g., welding) a nut, aligned with the aperture, to the bent length of material. With this configuration, the tool base elements 58, 74 and 82 are formed together as a monolithic body. Of course, in other embodiments, the entire tool base 44 may be formed as a monolithic body where, for example, the mount extensions 76 and 84 are omitted as illustrated, for example, in FIG. 5. The tool base 44 of the present disclosure, of course, is not limited to the foregoing exemplary formation techniques or constructions.

Figure 6:
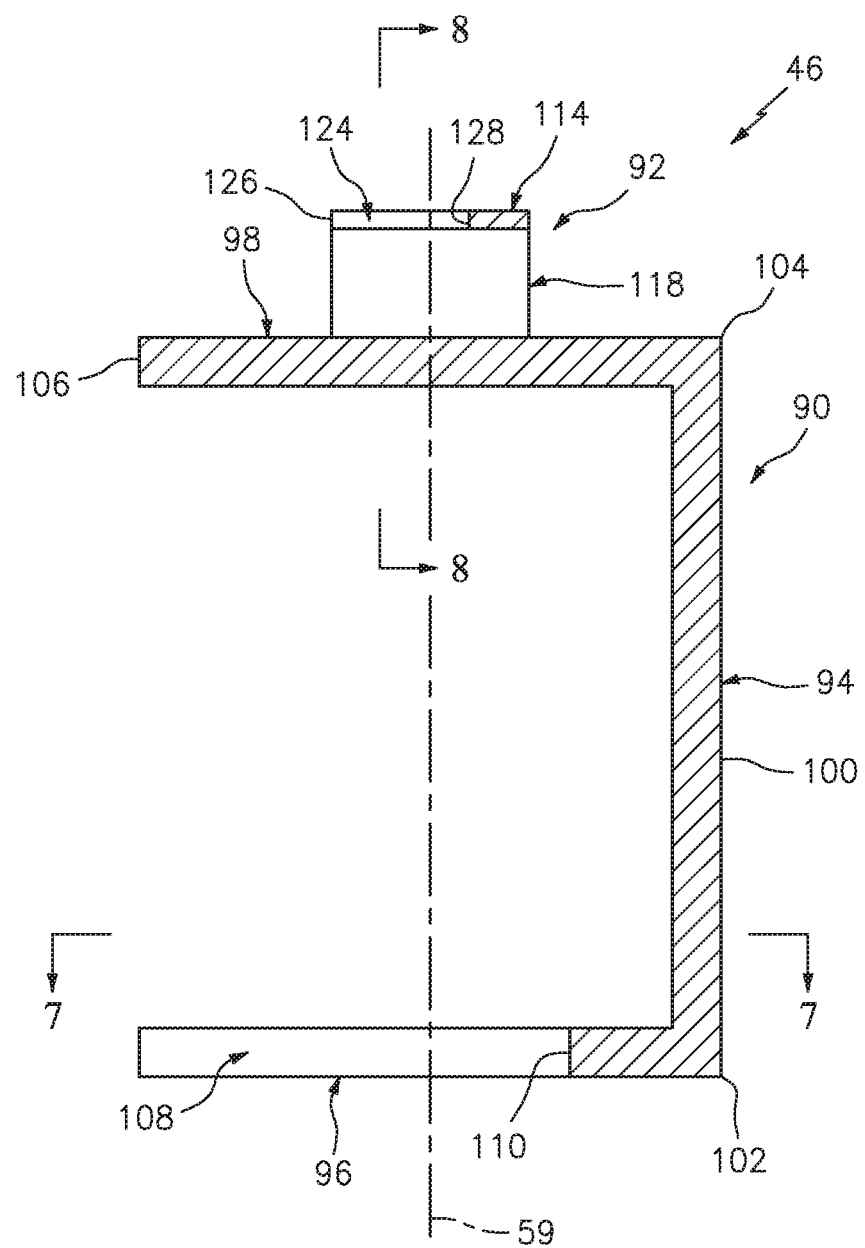
FIG. 6 is a side sectional illustration of a tool puller.

The tool puller 46 FIG. 6 includes a puller base 90 and a shaft mount 92. The puller base 90 of FIG. 6 has a C-shaped geometry when view, for example, in a plane parallel to the axis 59. For example, the puller base 90 includes a web 94 (e.g., a riser), a first flange 96 (e.g., a forked flange) and a second flange 98. The web 94 is at a first side 100 of the tool puller 46. The web 94 extends (e.g., axially) between opposing exterior corners 102 and 104 of the tool puller 46. The first flange 96 meets and is connected to (e.g., formed integral with) the web 94 at the first exterior corner 102. The first flange 96 projects (e.g., laterally) out from the web 94 in a fourth direction to a first distal end of the first flange 96 at a second side 106 of the tool puller 46, which second side 106 is laterally opposite the first side 100. The second flange 98 meets and is connected to (e.g., formed integral with) the web 94 at the second exterior corner 104. The second flange 98 projects (e.g., laterally) out from the web 94 in the fourth direction to a second distal end of the second flange 98 at the second side 106. The second flange 98 thereby laterally overlaps the first flange 96.

Figure 7:
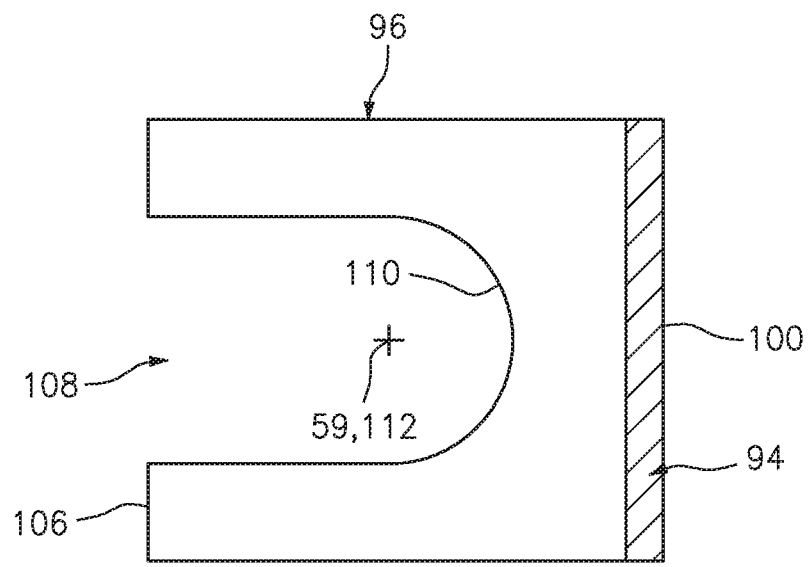
FIG. 7 is a sectional illustration of the tool puller taken along line 7-7 in FIG. 6.

Referring to FIGS. 6 and 7, the first flange 96 is configured with a component channel 108. This component channel 108 extends axially along the axis 59 through the first flange 96 between opposing sides of the first flange 96. The component channel 108 extends laterally into the first flange 96 from the first distal end at the side 106 to an end surface 110; e.g., a partially circular (e.g., semi-circular) surface. This end surface 110 partially forms the component channel 108, and has a center 112 that may be coaxial with the axis 59.

Figure 8:
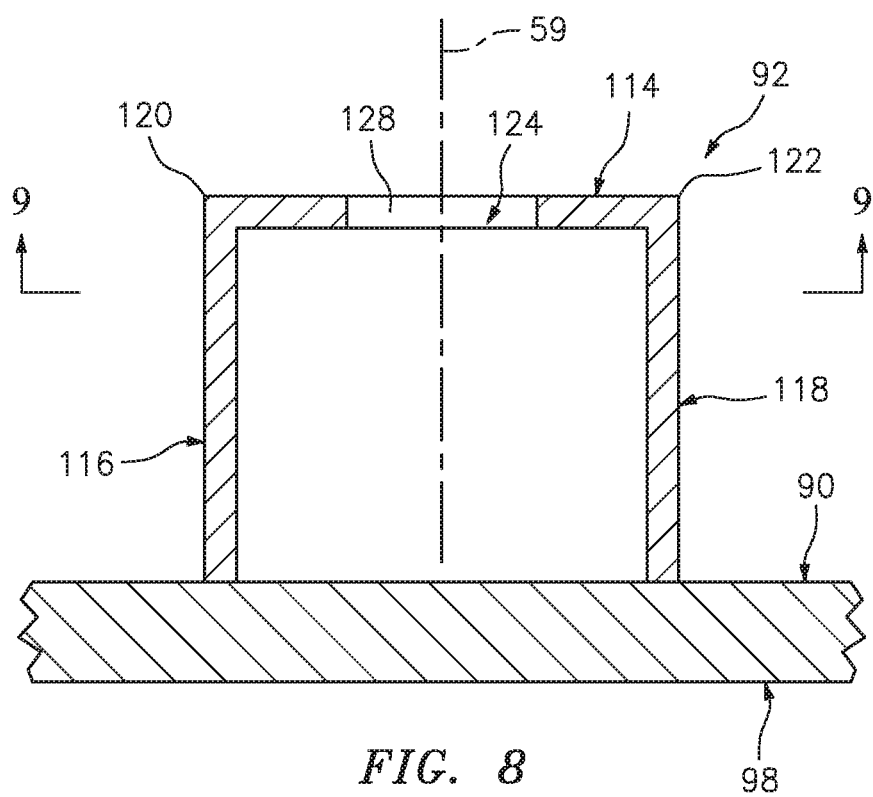
FIG. 8 is a sectional illustration of the tool puller taken along line 8-8 in FIG. 6.

Referring to FIGS. 6 and 8, the shaft mount 92 is connected to (e.g., formed integral with or bonded to) the puller base 90. In particular, the shaft mount 92 is connected to the second flange 98 and is outside of the U-shaped geometry; e.g., the second flange 98 is axially between the web 94 and the shaft mount 92.

The shaft mount 92 of FIGS. 6 and 8 includes a center portion 114, a first riser 116 and a second riser 118. The center portion 114 extends laterally between opposing exterior corners 120 and 122 of the shaft mount 92. The first riser 116 meets and is connected to (e.g., formed integral with) the center portion 114 at the first exterior corner 120. The first riser 116 projects (e.g., axially) out from the center portion 114 in the first direction to the second flange 98. The second riser 118 meets and is connected to (e.g., formed integral with) the center portion 114 at the second exterior corner 122. The second riser 118 projects (e.g., axially) out from the center portion 114 in the first direction to the second flange 98.

Figure 9:
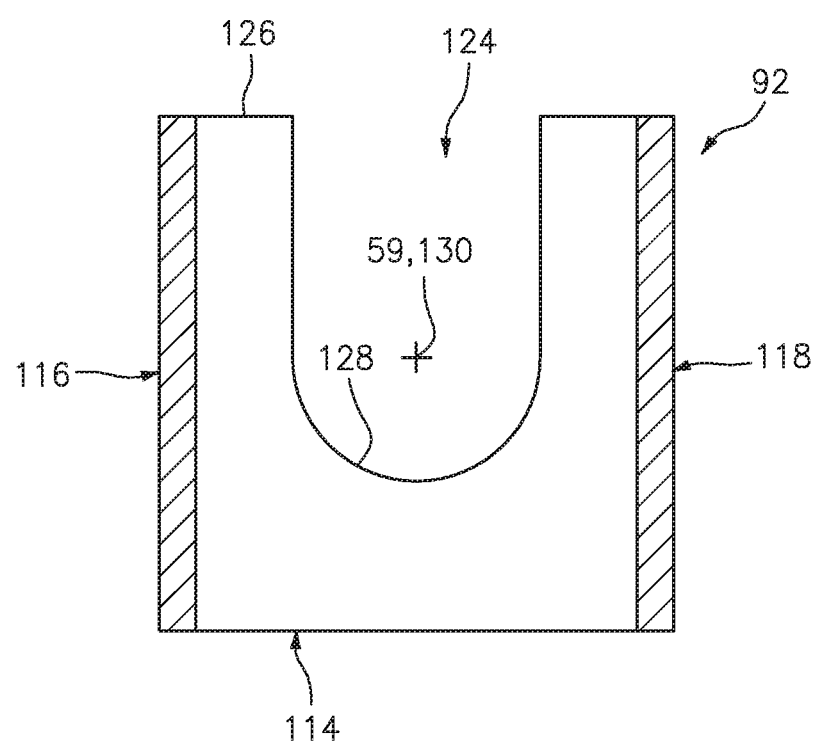
FIG. 9 is a sectional illustration of a shaft mount of the tool puller taken along line 9-9 in FIG. 8.

Referring to FIGS. 8 and 9, the center portion 114 is configured with a shaft channel 124. This shaft channel 124 extends axially along the axis 59 through the central portion 114 between opposing sides of the central portion 114. The shaft channel 124 extends laterally into the central portion 114 from a lateral side 126 of the shaft mount 92 to an end surface 128; e.g., a partially circular (e.g., semi-circular) surface. This end surface 128 partially forms the shaft channel 124, and has a center 130 that may be coaxial with the axis 59.

The tool puller 46 may be formed as a monolithic body. For example, the puller base 90 may be formed from a first piece of cut and bent material (e.g., metal). The shaft mount 92 may be formed from a second piece of cut and bent material (e.g., metal). The second piece of cut and bent material may then be welded or otherwise bonded to the first piece of cut and bent material to provide a monolithic tool puller body. The tool puller 46 of the present disclosure, however, is not limited to the foregoing exemplary construction.

Figure 10:
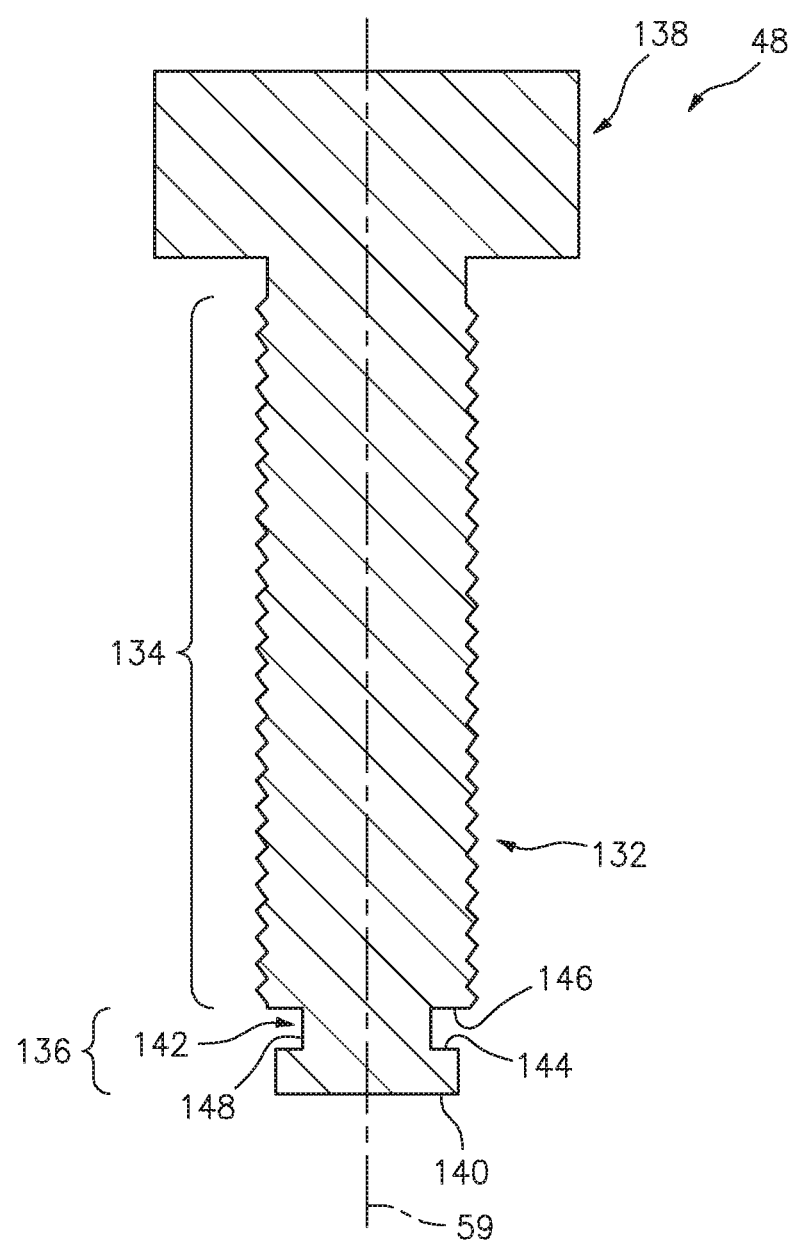
FIG. 10 is a side sectional illustration of a tool shaft.

Referring to FIG. 10, the tool shaft 48 includes a shank 132 with a threaded portion 134 and a distal end portion 136. The tool shaft 48 may also include an integral head 138 with a polygonal cross-sectional geometry (e.g., hexagonal cross-sectional geometry of FIG. 1) when viewed, for example, in a plane perpendicular to the axis 59.

The shank 132 of FIG. 10 is connected to and projects axially out from the head 138 to a distal end 140 of the tool shaft 48. The threaded portion 134 may be a portion of the shank 132 that extends axially from or near the head 138 to the distal end portion 136. The distal end portion 136 may be a portion of the shank 132 that extends axially from the threaded portion 134 to the distal end 140. The distal end portion 136 is thereby located at (e.g., on, adjacent or proximate) the distal end 140 of the tool shaft 48.

The distal end portion 136 may be a non-threaded portion of the shank 132. The distal end portion 136 of FIG. 10 is configured with an annular slot 142. This slot 142 extends through the tool shaft 48 circumferentially around the axis 59. The slot 142 extends axially along the axis 59 between axially opposing annular surfaces 144 and 146 of the tool shaft 48. The slot 142 extends radially into the tool shaft 48 to a cylindrical surface 148 that extends axially between the first and the second annular surfaces 144 and 146. The second annular surface 146 may be at an axial intersection between the threaded portion 134 and the distal end portion 136 of the tool shaft 48.

Figure 11:
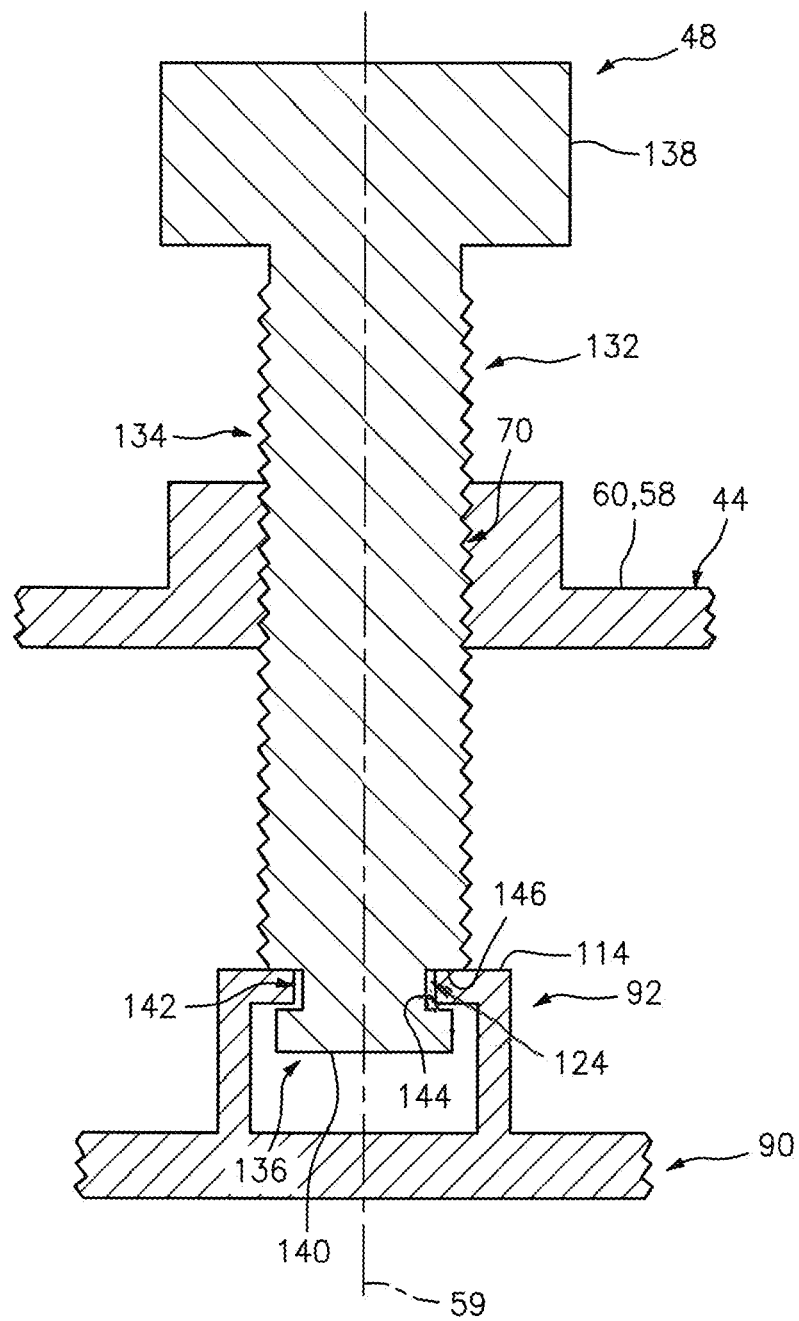
FIG. 11 is a side sectional illustration of the tool shaft mated with the tool mount and the tool puller.

Referring to FIG. 11, the distal end portion 136 is configured to mate with the shaft mount 92. For example, the distal end portion 136 is arranged within the shaft channel 124 such that the tool shaft 48 and its shank 132 extends axially through the shaft channel 124. The center portion 114 is also arranged within the slot 142 such that the annular surfaces 144 and 146 radially overlap and are axially engageable with (e.g., may contact) respective side surfaces of the center portion 114. With this configuration, the tool shaft 48 is rotatably connected to the shaft mount 92 and, thus, the tool puller 46 at (e.g., on, adjacent or proximate) the distal end 140.

The threaded portion 134 is mated with the threaded aperture 70.

Figure 12:
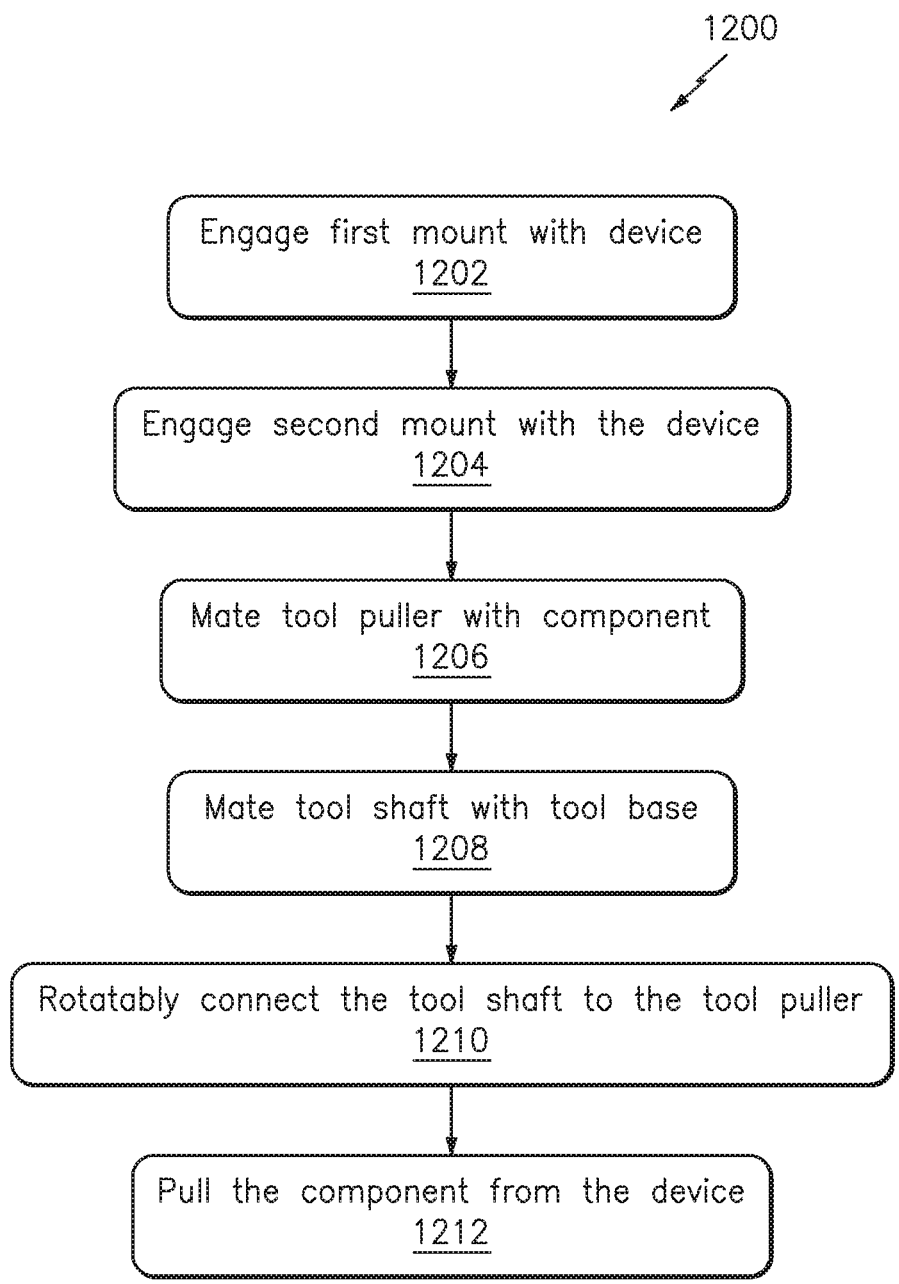
FIG. 12 is a flow diagram of a method for removing a component from a device using, for example, the apparatus of FIG. 1.

FIG. 12 is a flow diagram of a method 1200 for removing (e.g., pulling) a component from a device using an apparatus such as the apparatus 20 described above.

In step 1202, the first mount 54 is engaged with the device 24. For example, referring to FIG. 1, the first mount 54 may be abutted against, for example, a casing of the device 24. The first mount 54 may also be attached to the device 24 (e.g., a first portion of the casing) using the first fastener 50 as shown in FIG. 1, or alternatively in FIG. 5.

In step 1204, the second mount 56 is engaged with the device 24. For example, referring to FIG. 1, the second mount 56 may be abutted against, for example, the casing of the device 24. The second mount 56 may also be attached to the device 24 (e.g., a second portion of the casing) using the second fastener 52 as shown in FIG. 1, or alternatively in FIG. 5.

In step 1206, the tool puller 46 is mated with the component 22. For example, referring to FIG. 2, the tool puller 46 may be arranged such that the cylindrical portion 30 of the shaft 26 is within the component channel 108 and the first flange 96 is abutted axially against or otherwise engages the shoulder; e.g., the bearing 28 or the flange 32 (see FIG. 3). With this configuration, the shoulder is axially between the first and the second flanges 96 and 98 of the tool puller 46.

In step 1208, the tool shaft 48 is mated with the tool base 44. In particular, referring to FIG. 11 (see also FIGS. 1 and 2), the threaded portion 134 of the tool shaft 48 is threaded into the threaded aperture 70 in the bridge 58.

In step 1210, the tool shaft 48 is rotatably connected to the tool puller 46. In particular, the distal end portion 136 of the tool shaft 48 may be mated with the shaft mount 92 as described above.

In step 1212, the component 22 is removed (e.g., pulled) from the device 24. For example, a tool such as a wrench or socket (not shown) may be mated with the head 138 of the tool shaft 48. The tool may be used to rotate the tool shaft 48 about the axis 59 in such a manner than the head 138 moves away from the tool base 44, and the distal end portion 136 and, thus, the tool puller 46 move towards the tool base 44. The tool puller 46 may thereby pull the component 22 towards the tool base 44 and, thus, away from/out of the device 24.

While the steps of the method 1200 are described in a certain order above, the present disclosure is not limited to such an exemplary order. In particular, the steps 1202 to 1210 may be performed in various different orders.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for removing a component from a device, the component comprising a cylindrical portion and a shoulder adjacent the cylindrical portion, the apparatus comprising:
   a base including a first mount, a second mount and a bridge extending between and connected to the first mount and the second mount, the first mount and the second mount each configured to engage with the device;
   a puller comprising a forked flange, a second flange, an intermediate segment and a shaft mount, the forked flange configured to abut against the shoulder of the component when the cylindrical portion of the component is within a channel of the forked flange, the intermediate segment extending between and connected to the forked flange and the second flange, the shaft mount connected to the second flange, and the shaft mount comprising a shaft mount channel; and
   a shaft comprising a threaded portion and an annular slot, the threaded portion mated with a threaded aperture in the bridge, the annular slot extending axially within the shaft between a first annular surface and a second annular surface, and the shaft arranged within the shaft mount channel such that the first annular surface and the second annular surface respectively overlap and are axially adjacent opposing side surfaces of the shaft mount and a distal end portion of the shaft is rotatably connected to the shaft mount;
   wherein
   the shaft mount further includes a first riser, a second riser, and a center portion;
   the first riser projects axially out from the second flange to the center portion;
   the second riser projects axially out from the second flange to the center portion; and
   the center portion extends between and is connected to the first riser and the second riser, and the center portion comprises the shaft mount channel; and
   wherein the puller is formed as a monolithic body.

2. The apparatus of claim 1, wherein the base is formed as a monolithic body.

3. The apparatus of claim 1, wherein the bridge has a U-shaped geometry.

4. The apparatus of claim 3, wherein
   the first mount comprises a first tab that projects out from a first end of the bridge; and
   the second mount comprises a second tab that projects out from a second end of the bridge.

5. The apparatus of claim 1, wherein the base is formed from at least a bent length of metal and a nut bonded to the bent length of metal to provide the threaded aperture in the bridge.

6. The apparatus of claim 1, wherein the shaft mount channel is partially formed by a semi-circular surface of the shaft mount, and the semi-circular surface is coaxial with the threaded aperture.

7. The apparatus of claim 1, wherein the channel of the forked flange is partially formed by a semi-circular surface of the forked flange, and the semi-circular surface is coaxial with the threaded aperture.

8. The apparatus of claim 1, further comprising:
   a head with a polygonal cross-sectional geometry;
   the head formed integral with the shaft; and
   the shaft projecting axially out from the head to the distal end portion, wherein the threaded portion is axially between the head and the distal end portion.

9. The apparatus of claim 1, further comprising:
   a first fastener for attaching the first mount to a first portion of the device; and
   a second fastener for attaching the second mount to a second portion of the device.

10. The apparatus of claim 1, wherein the shaft mount channel projects laterally into the shaft mount from a side of the shaft mount.

11. The apparatus of claim 1, wherein the shaft mount channel is an open-ended slot.

* * * * *